Figure 1:
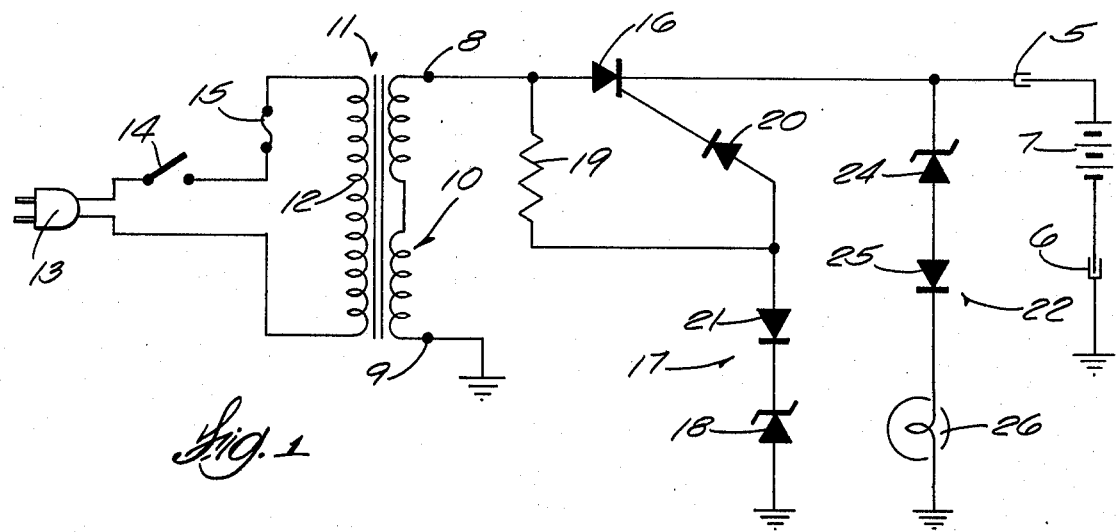

United States Patent [19]
Heindl

[11] 3,970,913
[45] July 20, 1976

[54] STATE-OF-CHARGE INDICATOR FOR VOLTAGE-REGULATED BATTERY CHARGER

[75] Inventor: Kenneth J. Heindl, West Allis, Wis.

[73] Assignee: Briggs & Stratton Corporation, Wauwatosa, Wis.

[22] Filed: Dec. 16, 1974

[21] Appl. No.: 532,999

[52] U.S. Cl............................ 320/48; 320/DIG. 2; 320/40; 320/59
[51] Int. Cl.² ........................................... H02J 7/04
[58] Field of Search ............. 320/DIG. 2, 2, 43, 39, 320/40, 48, 57–59

[56] References Cited
UNITED STATES PATENTS

| | | | |
|---|---|---|---|
| 3,205,422 | 9/1965 | Gold | 320/39 |
| 3,305,774 | 2/1967 | Heath | 320/48 X |
| 3,321,754 | 5/1967 | Grimm et al. | 320/48 UX |
| 3,534,354 | 10/1970 | Galginaitis | 320/48 X |
| 3,599,073 | 8/1971 | Wilson et al. | 320/39 |

*Primary Examiner*—J. D. Miller
*Assistant Examiner*—Robert J. Hickey

[57] ABSTRACT

A signaling circuit is connected across the output terminals of a voltage-regulated battery charger that also has a.c. input terminals, an SCR connected between one input terminal and an output terminal, and a regulating circuit connected with the gate of the SCR and comprising a zener diode. The signaling circuit comprises a small lamp bulb connected in series with another zener diode, the latter having a zener voltage such as to pass current through the bulb only when voltage at the output terminals is at or above the value corresponding to a fully charged battery.

4 Claims, 2 Drawing Figures

STATE-OF-CHARGE INDICATOR FOR VOLTAGE-REGULATED BATTERY CHARGER

This invention relates to battery charging apparatus and is more particularly concerned with very simple and inexpensive means in a voltage-regulated battery charger for indicating the state of charge of a battery connected to the charger.

There are many applications in which an inexpensive voltage-regulated battery charger is needed for recharging a storage battery at more or less frequent intervals. As an example, an electric motor that powers a lawn mower may be energized from a storage battery carried on the mower, and at the end of each period of use of the mower its battery is recharged from a household current supply by connecting the battery with a charger that is plugged into a wall socket.

The charger can comprise a transformer and a few solid-state components, connected in a known manner to provide for rectification of the alternating current and for regulation of the charging voltage applied to the battery, and hence the charger itself can be relatively compact, inexpensive and sturdy. However, it is very desirable that such a charger be equipped with means for indicating the state of charge of a battery connected with it, to enable the battery to be fully charged at each charging and to be disconnected from the charger when charging is accomplished.

Heretofore the most frequently used state-of-charge indicator for such a battery charger — when such an indicator was provided — was an ammeter that was connected in its output circuit. The ammeter was expensive and relatively bulky, and, equally important, it comprised a rather delicate mechanism, whereas a battery charger of the type here being considered is likely to be stored and used in a garage or a shed where it is exposed to dust, dirt and high humidity and may be subjected to bumps, blows, extremes of temperature and other abuses. Often, too, the charger is used in a poorly lighted location, so that the indications of an ammeter are not readily visible. It is also probable that the analogue-type readout of an ammeter is confusing or annoying to many persons, inasmuch as it frequently confronts them with the need for interpretation or decision, whereas they would prefer a yes-or-no indication that tells them definitely and unambiguously whether or not battery charging can be terminated.

With these considerations in mind, it is an object of the present invention to provide a signaling device for a battery charger of the character described, for producing a readily perceptible and unambiguous output denoting whether or not a battery connected with the charger is fully charged, which signaling device is substantially less expensive than an ammeter and much more rugged and reliable, so that it is well adapted for inexpensive battery chargers.

In a preferred form of the present invention it comprises merely a zener diode so connected with a small light bulb as to cause the latter to light when a battery connected with the charger reaches a condition of substantially full charge; hence it is another object of this invention to provide a state-of-charge indicator which is simple and inexpensive, has no parts that can be injured by the abuse that a battery charger tends to receive and produces a battery-charged indication which is visible in the dark and which is definite and unmistakable.

Another object of this invention is to provide a state-of-charge indicator of the character described that is adapted for incorporation in both wall-plug chargers and those that have their source of charging current in a small engine driven alternator or the like, and which can be incorporated into chargers with both half-wave and full-wave rectification.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

Figure 2:
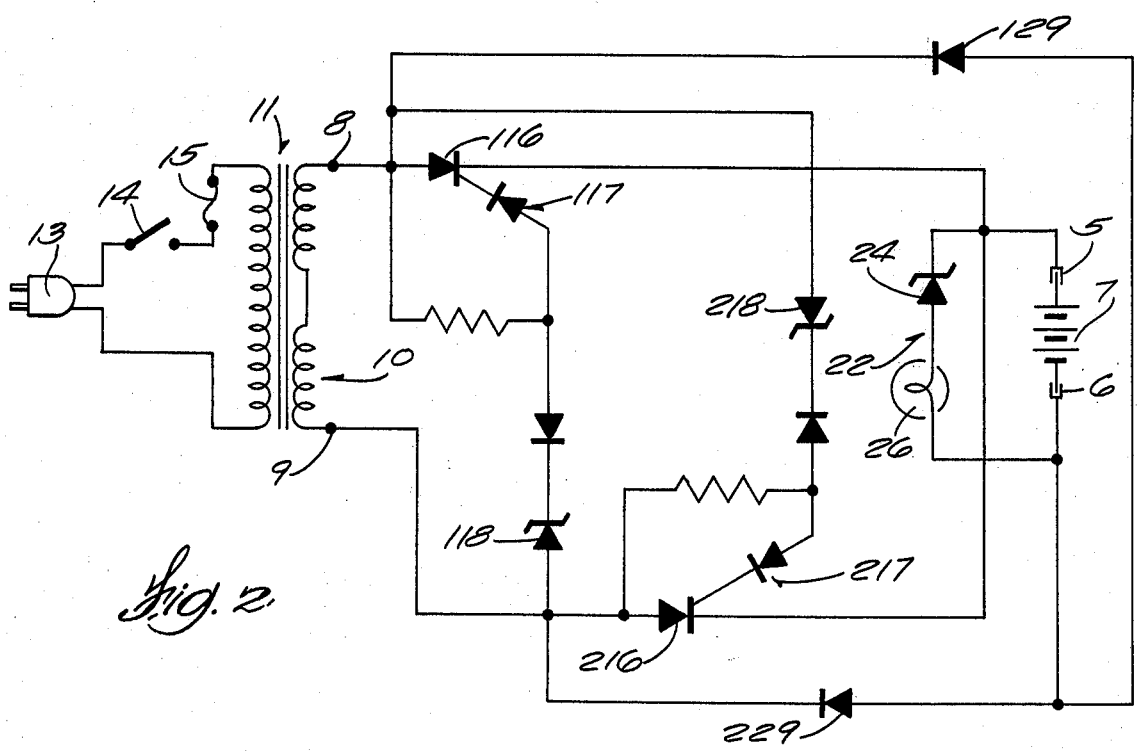

The accompanying drawing illustrates two complete examples of embodiments of the invention constructed according to the best modes so far devised for the practical application of the principles thereof, and in which:

FIG. 1 is a circuit diagram of a battery charger having half-wave rectification and incorporating a state-of-charge indicator that embodies the principles of the present invention; and FIG. 2 is a circuit diagram illustrating the incorporating of a state-of-charge indicator of this invention in a charger having full-wave rectification.

Referring now to the accompanying drawings, each of the figures depicts a battery charging apparatus having a pair of output terminals 5 and 6 to which a storage battery 7 can be connected for charging, and having input terminals 8 and 9 that provide a source of alternating current at a predetermined substantially constant peak voltage. As here illustrated, the input terminals 8 and 9 comprise the ends of a secondary winding 10 of a step-down transformer 11. The primary winding 12 of that transformer is adapted to be connected with a household source of alternating current by means of a conventional plug 13 and through an on-off switch 14 and a fuse 15. It will be understood that the input to terminals 8 and 9 could be from any other suitable a.c. source, as for example a small engine-driven alternator.

The apparatus illustrated in FIG. 1 provides for half-wave rectification of the charging current fed to the battery 7. To this end the charger has an SCR or controlled rectifier 16 which is connected between an input terminal 8 and an output terminal 5 and which has its gate connected in a more or less conventional regulator circuit 17 that comprises a zener diode 18. The input terminal 9 of the charger and its output terminal 6 are directly connected with one another, as by grounding, and charging current is fed to the battery only during one-half of the a.c. input cycle, the other half-cycle always being blocked by the SCR 16.

As is conventional, the regulating circuit 17 comprises a resistor 19, a pair of rectifier diodes 20 and 21 that are connected back-to-back, and the zener diode 18. The resistor 19, which serves for current control, is connected between the input terminal 8 and the junction of the back-to-back diodes 20 and 21. The diode 20 is so connected with the gate of the SCR 16 that biasing current can flow through it and the resistor during the half-cycles of the a.c. wave that correspond to the forward direction of the SCR. The portions of those half-cycles during which the SCR will be biased into conductivity are controlled by the zener diode 18, which is connected between the diode 21 and ground. The diodes 20 and 21 provide for voltage trimming and isolation.

The zener diode 18 is chosen to have a breakdown or zener voltage value such that it cooperates with the resistor 19 to maintain at the gate of the SCR a substantially constant maximum potential that is approximately equal to the voltage that exists across the terminals of a fully charged battery. The zener diode bypasses current to ground as necessary to prevent the potential at the gate of the SCR from exceeding that maximum value. When the battery is fully charged, the potential at the gate of the SCR never exceeds that at the output terminal 5, and the SCR remains in its blocking condition. When the battery is not up to its full charge, there will be a potential difference between the gate of the SCR and the output terminal 5 during at least a portion of each battery-charging a.c. half-cycle, and when such potential difference exists the SCR will be gated to pass charging current to the battery. The point in each such half-cycle at which the SCR becomes conductive will depend upon the voltage across the battery and the back voltage or zener value of the zener diode 18.

The battery charging indicator means of this invention, which is generally designated by 22, is connected across the output terminals 5 and 6 of the charging apparatus and consists of a second zener diode 24 and an indicating or signaling device 26, connected in series with one another.

The signaling device 26 is illustrated as a small lamp bulb, and for most applications a lamp bulb would be preferred, both because of the character of its signal and the low cost of replacement in the event of breakage. Obviously, however, the signaling device could take the form of a buzzer, an annunciator, or any similar device that produces a readily perceptible indication when energized with a small current.

The second zener diode 24 has a reverse or breakdown voltage value which is a little lower than that of the zener diode 18 in the regulation circuit, and such that current flows through the second zener diode when voltage across the output terminals 5 and 6 corresponds to that of a fully charged battery. It is so arranged that a reverse or zener voltage can exist across it during the a.c. half-cycles in which the SCR can conduct.

When the voltage across the output terminals is below that for a fully charged battery, the light bulb is therefore dark. But when a battery connected across the output terminals has come up to substantially full charge, the bulb will burn steadily. At that time the SCR will pass just enough current, during a part of each a.c. cycle, to energize the bulb 26 and maintain the battery charged to the point that the voltage across its terminals will be the maximum that the second zener diode 24 can support. Lighting of the bulb thus provides an unambiguous signal that the battery is fully charged.

For voltage trimming across the second zener diode 18, one or more diodes 25 can be connected in series with it and the lamp bulb 26, thus allowing the zener diodes 18 and 24 to be identical with one another.

If by chance the charger should become disconnected from its alternating current supply while the battery is connected to it, the battery can discharge through the lamp bulb only to the extent permitted by the second zener diode 24, which is to say that voltage across the battery terminals will not fall below a value corresponding to substantially full charge.

The circuit illustrated in FIG. 2 is basically similar to that illustrated in FIG. 1, except that it provides for full-wave rectification, having two SCRs 116, 216. Each of its input terminals 8 and 9, respectively, is connected with its output terminal 5 through one of said SCRs. The output terminals 6 is connected with the respective input terminals 8 and 9 through diodes 129 and 229. Each of the SCRs has is gate connected with a regulator circuit 117, 217 like that described above, each regulator circuit comprising a zener diode 118, 218, respectively.

The indicator circuit 22 is again connected directly across the output terminals 5, 6, and again comprises a zener diode 24 and a lamp bulb 26, connected in series with one another. Operation of the indicator circuit is as described above, in that the zener diode 24 cooperates with the SCRs and with the zener diodes 118, 218 of their regulating circuits to keep the bulb dark until the battery 7 is fully charged, and then to light it.

From the foregoing description taken with the accompanying drawings, it will be apparent that this invention provides an indicator for a regulated battery charger that provides a readily perceptible and unambiguous indication when a storage battery connected with the charger has reached a fully charged condition, and that the state-of-charge indicator of this invention is simple, inexpensive and relatively immune to the effects of knocks, blows, dirt, temperature extremes, high humidity and other conditions which would be detrimental to an ammeter.

Those skilled in the art will appreciate that the invention can be embodied in forms other than as herein disclosed for purposes of illustration.

The invention is defined by the following claims:

1. In combination with voltage regulated battery charging apparatus of the type having a pair of output terminals to which a storage battery can be connected for charging, a pair of input terminals that provide a source of alternating current having a substantially constant peak voltage, a controlled rectifier which has a gate and which is connected to control flow of current between one of said input terminals and one of said output terminals, and regulating means which comprises a zener diode and which has connections with said gate, with said one input terminal and with the other output terminal, for causing the controlled rectifier to be forwardly conductive when the difference between voltage across the input terminals and voltage across the output terminals exceeds a predetermined value, means for indicating the state of charge of a battery connected with the output terminals, the last mentioned means comprising:

A. a second zener diode;
   B. a device capable of producing a perceptible signal upon being electrically energized; and
   C. means connecting said device and the second zener diode in series with one another and across the output terminals, with the second zener diode being so connected and having such a zener value that it permits flow of energizing current through said device when voltage across the output terminals is high enough so that said difference remains substantially equal to said predetermined value.

2. The combination of claim 1, further characterized by:

said second zener diode having a zener value lower than that of the first mentioned zener diode.

3. The combination of claim 1 wherein said device comprises a lamp bulb.

4. Signaling means for regulated battery charging apparatus, for indicating the state of charge of a storage battery that has its terminals connected with a pair of output terminals of said apparatus, said apparatus also having a pair of input terminals that provide a source of alternating current, a controlled rectifier connected between one of said input terminals and one of said output terminals and having a gate, and regulation means comprising a zener diode, said regulation means being so connected with said gate, said one input terminal and the other output terminal as to cause the controlled rectifier to be forwardly conductive whenever the difference between voltage across the input terminals and voltage across the output terminals exceeds a predetermined value, said signaling means comprising:

A. a signaling device capable of producing a perceptible output upon being electrically energized; and
B. means so connecting said signaling device across said output terminals as to cause the signaling device to be energized whenever voltage across the output terminals is at a level high enough so that said difference tends to remain substantially at said value, the last mentioned means comprising a second zener diode connected in series with the signaling device and arranged to prevent current flow through said device when voltage across the output terminals is below said level, said second zener diode having a zener voltage such as to pass energizing current through said device when voltage across the output terminals is at said level.

* * * * *